(12) United States Patent
Kolmanovsky et al.

(10) Patent No.: US 7,565,899 B2
(45) Date of Patent: Jul. 28, 2009

(54) ENGINE FUELING CONTROL DURING CYLINDER VALVE MODE TRANSITIONS

(75) Inventors: Ilya V. Kolmanovsky, Novi, MI (US); Gang Song, Canton, MI (US); John Ottavio Michelini, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 98 days.

(21) Appl. No.: 11/761,739

(22) Filed: Jun. 12, 2007

(65) Prior Publication Data

US 2008/0308069 A1    Dec. 18, 2008

(51) Int. Cl.
*F02D 13/06*    (2006.01)
*F02D 7/00*    (2006.01)

(52) U.S. Cl. .................... 123/481; 123/198 F

(58) Field of Classification Search ............... 123/481, 123/198 F, 432, 308, 321, 325, 492, 493, 123/348, 90.15, 90.11, 90.12, 90.14
See application file for complete search history.

(56) References Cited

U.S. PATENT DOCUMENTS

| | | | |
|---|---|---|---|
| 5,558,060 A | 9/1996 | Horie et al. | |
| 6,273,060 B1 | 8/2001 | Cullen | |
| 6,374,813 B1 | 4/2002 | Iida et al. | |
| 6,386,156 B1 * | 5/2002 | Stockhausen et al. | 123/90.15 |
| 6,425,369 B2 * | 7/2002 | Arai et al. | 123/348 |
| 6,431,130 B1 * | 8/2002 | Leone et al. | 123/90.15 |
| 6,484,677 B2 | 11/2002 | Leone et al. | |
| 6,513,493 B1 * | 2/2003 | Robichaux et al. | 123/399 |
| 6,553,961 B2 | 4/2003 | Hammoud et al. | |
| 6,659,054 B2 * | 12/2003 | Sugiyama et al. | 123/90.16 |
| 6,959,692 B2 | 11/2005 | Song et al. | |
| 7,032,581 B2 | 4/2006 | Gibson et al. | |
| 7,111,593 B2 | 9/2006 | Song et al. | |
| 7,156,072 B2 | 1/2007 | Song et al. | |
| 7,213,548 B2 | 5/2007 | Lewis et al. | |
| 7,216,640 B2 | 5/2007 | Song et al. | |

* cited by examiner

*Primary Examiner*—Mahmoud Gimie
(74) *Attorney, Agent, or Firm*—Allan J. Lippa; Alleman Hall McCoy Russell & Tuttle LLP

(57) ABSTRACT

A method of control fueling of a cylinder in an internal combustion engine, the cylinder having at least two intake valves, the method comprising of operating in a first mode with one active intake valve and one inactive intake valve during a cycle of the cylinder operating in a second mode with two active intake valves during a cycle of the cylinder and adjusting a fuel injection from an injector configured to deliver fuel through at least the two intake valves, where the fuel injection adjustment is responsive to a transition in modes and based on whether the transition is from the first mode to the second mode, or from the second mode to the first mode.

19 Claims, 7 Drawing Sheets

ENGINE FUELING CONTROL DURING CYLINDER VALVE MODE TRANSITIONS

BACKGROUND AND SUMMARY

Engines may utilize electrically actuated valves to enable improved engine operation in a variety of situation. For example, engine cylinders having a plurality of intake valves may operate under some conditions with multiple intake valves active, and under other conditions with one intake valve active. One such system is described in U.S. Pat. No. 7,213,548.

The inventors herein have recognized that air-fuel ratio excursions may occur during valve mode transitions, such as from dual intake valve operation (2V) to single intake valve operation (1V), such as alternating intake valve operation, in Electronic Valve Actuation (EVA) engines. In particular, the inventors have recognized that when a dual port configuration having an injector per cylinder centered over two ports, such transient fueling errors may be particularly prevalent. Various interrelated issues may be involved in creating the air-fuel ratio error. For example, in alternating intake valve operation, large fuel puddles and fuel vapors may develop in the deactivated port. While this can be addressed with alternating valve operation, such operation generates still further air-fuel ratio errors. For example, when a valve is deactivated, only a fraction of fuel may enter the cylinders on the first cycle after deactivation and some may remain in the deactivated port. This can produce a lean excursion in A/F. Likewise, when the valve is reactivated, the additional fuel left over from a previous cycle when the valve was deactivated may enter the cylinder, and a rich A/F spike may be produced.

As such, in one approach a method of control fueling of a cylinder in an internal combustion engine, the cylinder having at least two intake valves, may be used. The method may comprise operating in a first mode with one active intake valve and one inactive intake valve during a cycle of the cylinder; operating in a second mode with two active intake valves during a cycle of the cylinder; and adjusting a fuel injection from an injector configured to deliver fuel through at least the two intake valves, where the fuel injection adjustment is responsive to a transition in modes and based on whether the transition is from the first mode to the second mode, or from the second mode to the first mode.

In this way, it is possible to rapidly transition a plurality of engine cylinders between valve modes, such as between dual intake and alternating single intake valve modes, while reducing air-fuel ratio excursions, and uneven valve wear and deposits.

DETAILED DESCRIPTION

Figure 1:
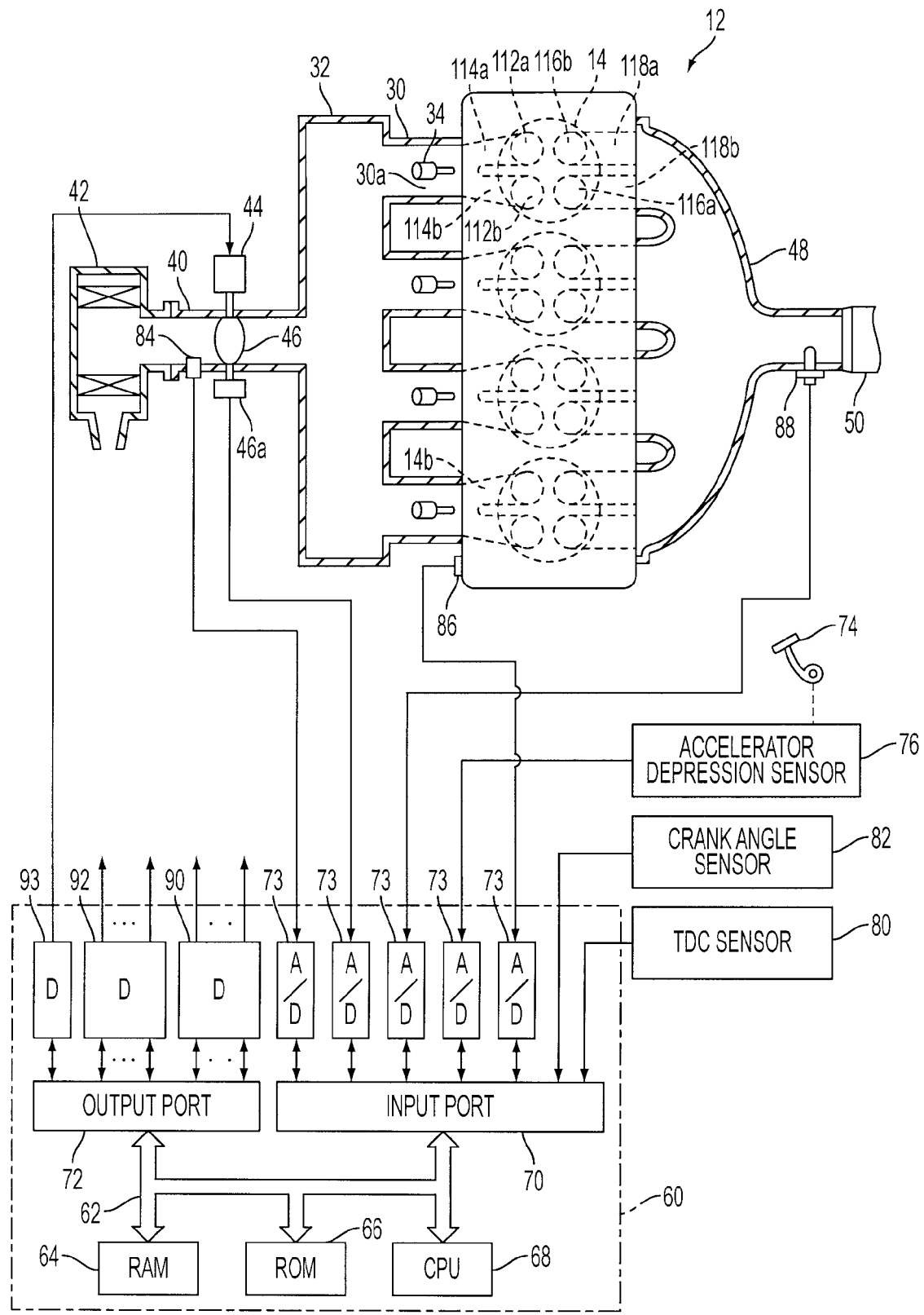
FIG. 1 shows an example engine configuration

FIG. 1 shows a schematic block diagram of an internal combustion engine 12 having a control system. FIG. 1 shows a longitudinal sectional view of the engine 12. The engine 12 may be installed in a motor vehicle so as to drive the vehicle. The engine 12 is shown having four cylinders, one of which is indicated as cylinder 14, although the engine may have any number of cylinders. While this embodiment shows a four-cylinder inline engine, in another embodiment the engine may be a V-8 engine having two banks of four cylinders.

Each cylinder 14 has a combustion chamber that is defined by a cylinder block, a cylinder head mounted on the cylinder block 4, and a piston disposed inside the cylinder block for reciprocating movements. Each combustion chamber may have a first intake valve 112a, a second intake valve 112b, a first exhaust valve 116a and a second exhaust valve 116b. While this example shows four valves per cylinder, in another example, two intake valves and one exhaust valve may be used. The valves 112a, 112b, 116a, 116b may be electromagnetically driven valves, mechanically driven valves, and/or combinations thereof. In one example, electrically driven intake valves may be used with mechanically driven exhaust valves.

The valves of each cylinder may be disposed so that the first intake valve 112a opens and closes a first intake port 114a, the second intake valve 112b opens and closes a second intake port 114b, the first exhaust valve 116a opens and closes a first exhaust port 118a, and the second exhaust valve 116b opens and closes a second exhaust port 118b.

As shown in FIG. 1, the first intake port 114a and the second intake port 114b of each cylinder are connected to an intake manifold 32 via an intake passages 30a formed in an intake runners 30. Each intake passage 30a may be provided with a port fuel injection valve 34 for injecting an amount of fuel into the first and second intake ports 114a and 114b. In one example, injector 34 may be symmetrically positioned with respect to the first and second intake ports 114a. However, injector 34 may be positioned or aimed more to one intake port than another. Further, the injectors may be differentially positioned from one cylinder to another, such as based on port geometry, etc.

Manifold 32 may be connected to an air cleaner 42 via an intake duct 40. A throttle valve 46 that is driven by a motor 44 (e.g., a DC motor or a step motor) may be disposed in the intake duct 40. The degree of opening of the throttle valve 46 may be detected by a throttle opening sensor 46a, and may be controlled in accordance with operational conditions of the engine 12 and the operation of an accelerator pedal 74.

The first exhaust port 18a and the second exhaust port 18b of each cylinder may be coupled to an exhaust manifold 48, whereby exhaust gas is led to a catalytic converter 50 and then exits the exhaust system to the atmosphere.

An electronic control unit, which may be included in the control system, 60 may include a digital computer equipped with a RAM (random access memory) 64, a ROM (read-only memory) 66, a CPU (microprocessor) 68, an input port 70, and an output port 72 that are interconnected by a bidirectional bus 62.

The throttle opening sensor 46a for detecting the throttle opening TA communicates with the input port 70 via an A/D converter 73. The accelerator pedal 74 is provided with an accelerator depression sensor 76 that communicates the amount of depression of the accelerator pedal 74 ("PP") to the input port 70 via an A/D converter 73. A top dead center sensor 80 generates an output pulse when, for example, the No. 1 cylinder of the cylinders reaches top dead center of piston movement. The output pulse of the top dead center sensor 86 is inputted to the input port 70. A crank angle sensor 82 generates an output pulse every time a crankshaft turns 30 degree2. The output pulse of the crank angle sensor 82 is inputted to the input port 70. Based on the output pulse of the top dead center sensor 80 and the output pulse of the crank angle sensor 82, the CPU may calculate a present crank angle. Based on the frequency of output pulses of the crank angle sensor 82, the CPU 68 may calculate an engine revolution speed.

The intake duct 40 is provided with an intake air amount sensor 84 that communicates an amount of intake air flowing through the intake duct 40 to the input port 70 via an A/D converter 73. The cylinder block of the engine 12 may also be provided with a water temperature sensor 86 that detects the temperature of cooling water of the engine 12 and communicates the cooling water temperature to the input port 70 via an A/D converter 73. The exhaust manifold 48 may further be provided with an air-fuel ratio sensor 88 that communicates a measured air-fuel ratio, or relative air-fuel ratio, to the input port 70 via an A/D converter 73. Finally, various other signals may also inputted to the input port 70.

The output port 72 may be connected to the fuel injection valves 34 via a corresponding drive circuit 90. In accordance with the operational condition of the engine 12, the ECU 60 performs a control of opening each fuel injection valve 34, and performs a fuel injection timing control and a fuel injection amount control. The output port 72 may also be connected to the intake valves 12*a*, 12*b* and the exhaust valves 16*a*, 16*b*, via a drive circuit 92. In accordance with the operational condition, the ECU 60 may perform a control of opening the valves 12*a*, 12*b*, 16*a*, 16*b*, and performs an intake air amount control, an exhaust control, and an internal EGR control. The output port 72 may also be connected to the motor 44 via a drive circuit 93. The ECU 60 controls the degree of opening of the throttle valve 46 in accordance with the operational condition of the engine 12 and the accelerator depression PP, and various other parameters. While FIG. 1 shows a single control unit, multiple control units may also be used.

The electrically or electromagnetically driven valves (e.g., 12*a*, 12*b*, 16*a*, and/or 16*b*) may be of various types. For example, they may each have two electromagnets, one for opening and one for closing. Further, the electromagnets may include permanent magnets. Further, the actuators may be direct acting on the valve stem, and/or may use various lever configurations.

As described in further detail herein, the valves in the engine cylinders may operate in various modes. For example, the engine can operate in a cylinder deactivation mode, with one or more cylinders operating with intake and/or exhaust valves held closed, and without fuel injection. Further, cylinders may operate with valves in different modes, such as operating with less than all of the intake valves active during a cylinder combustion cycle, or with all valves active. Also, active valves may operating in a variety of ways, including using both magnets for opening/closing operation, using levitation to reduce valve noise and compensate for valve lash, and/or using ballistic operation in which only the opening, or only the closing, actuator is used (along with a spring) to open and close a valve. Various example engine and valve modes are described further herein with regard to FIG. 2B, for example.

Depending on operating conditions, such as speed and/or load, for example, different valve modes may be more or less advantageous. For example, operating with one intake valve active during a cylinder cycle, along with using levitation operation, may reduce noise and power consumption as compared to two valve operation, also with levitation. Additionally, a transition to two valve operation (without levitation) may be beneficial at higher speeds and loads. When transitioning a port fuel injected with a single injector per cylinder engine between valve modes, the operating intake valve may be alternated in the consecutive cycles to improve performance and reduce fuel puddle and vapor build-up in the deactivated port, as well as equalize valve wear. However, such transitions can result in air-fuel ratio excursions. As described herein, one approach to address such excursion includes utilizing fuel adjustments that may be added to already existing transient fuel compensation without necessarily utilizing individual port fuel puddle/vapor modeling, although individual port models may be used, if desired.

Figure 2A:
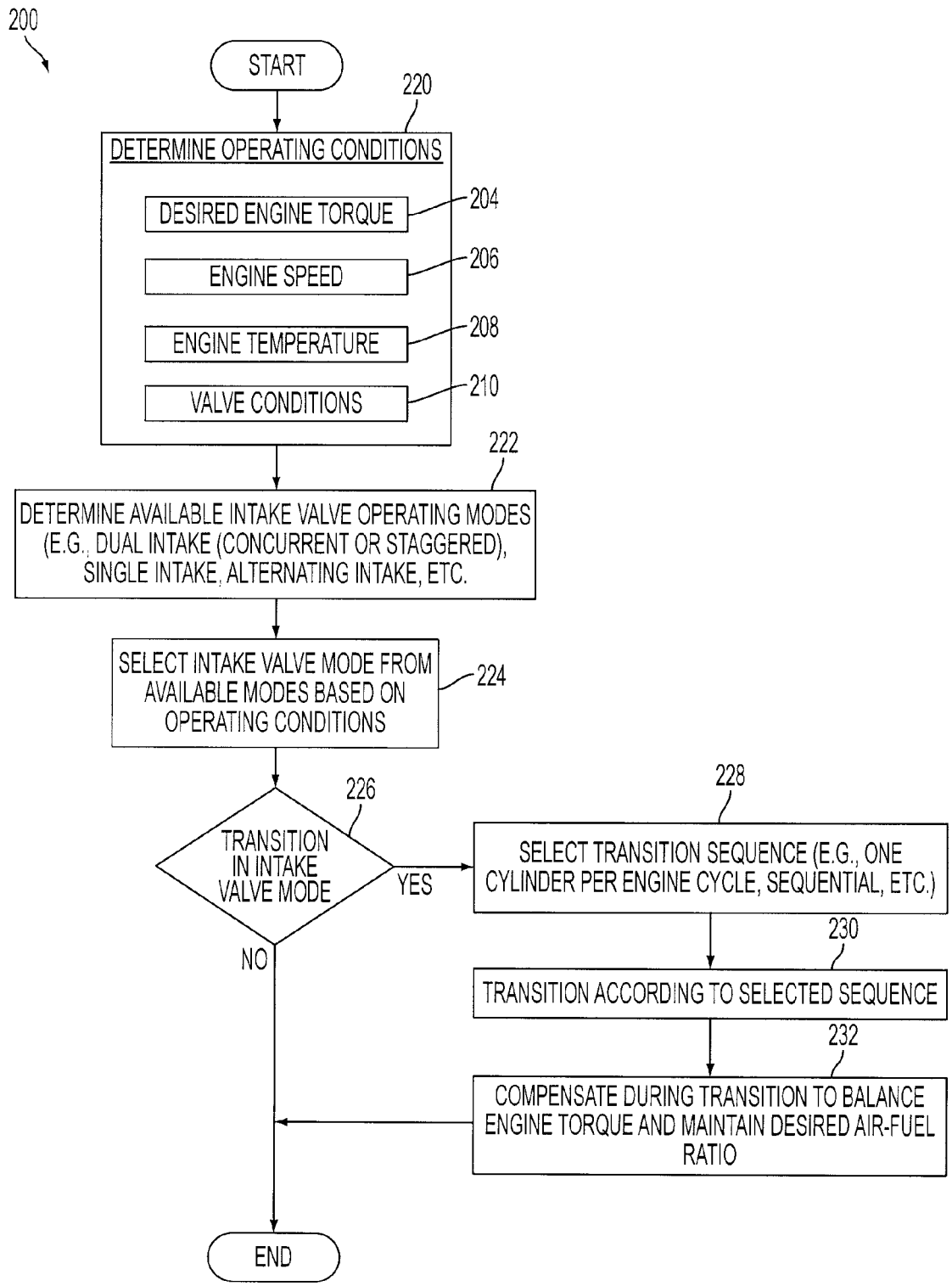
FIGS. 2A, and 3-4 show high level flowcharts of example operation.

Referring now to FIG. 2A, a flowchart describes an example method 200 for controlling engine operation. The method may include a routine carried out by the control system.

The following figures show high level flow charts of various operations that may be used. The specific routines described below in the flow diagrams may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages of the example embodiments described herein, but is provided for ease of illustration and description. Although not explicitly illustrated, one or more of the illustrated acts or functions may be repeatedly performed depending on the particular strategy being used. Further, these figures may graphically represent code to be programmed into computer readable storage medium in a controller, such as the ECU.

First, in 220, the routine determines various operating conditions, such as engine operating conditions, ambient environmental conditions, vehicle operating conditions, driver commands, etc. In the illustrated embodiment, the routine determines a desired engine torque at 204, which may be based on PP, vehicle speed, and transmission gear ratio, engine speed at 206, engine temperature at 208, and a valve condition at 210. The valve condition at 210 may include a valve temperature, valve degradation, and/or another valve operating condition. Next, in 222, the routine determines available intake valve operating modes based on operating conditions, such as noted in 220. For example selected valve modes may be available when valve temperatures are within a range, or after engine warm-up has occurred. Further, selected valve modes may be available only when valve diagnostics indicate valve operation has not degraded.

The intake valve operating modes may include operating two intake valves during a combustion cycle (e.g., opening a first and second intake valve at least partially during an intake stroke to induct charge into the cylinder), which may be referred to as dual intake (DI) valve operation. Within DI valve operation the intake valves may operate with substantially similar opening and/or closing timings, or the valve timings may be staggered to adjust cylinder charge properties, internal EGR, etc.

The intake valve operating modes may further include operating one intake valve during a combustion cycle (e.g., opening a first intake valve at least partially during an intake stroke to induct charge into the cylinder, while holding a second intake valve closed during the combustion cycle), which may be referred to as single intake (SI) valve operation. With respect to SI valve operation, from cylinder cycle to cycle, the same intake valve may repeatedly be operated, or at selected intervals, a different single intake valve may be used. When alternating intake valves are used from one combustion cycle to another in cylinder, this may be referred to as alternating single intake (AI) valve operation. In one embodiment, during a first combustion cycle, intake valve 112a may be operated (e.g., during the intake stroke), and during the next combustion cycle in that cylinder, intake valve 112b may be operated (e.g., during the intake stroke), and so on. Alternatively, the operating intake valve may be switched after a predetermined number of engine and/or cylinder cycles.

Finally, various other valve modes also be used, such as selected cylinder valve patterns such as diagonally positioned intake and exhaust valve actuation, etc.

Next, in 224, the routine selects an intake valve mode from the available modes based on operating conditions. In one example, an engine speed/load map, such as shown in FIG. 2B may be used to select both the engine cylinder mode and/or valve mode.

Figure 2B:
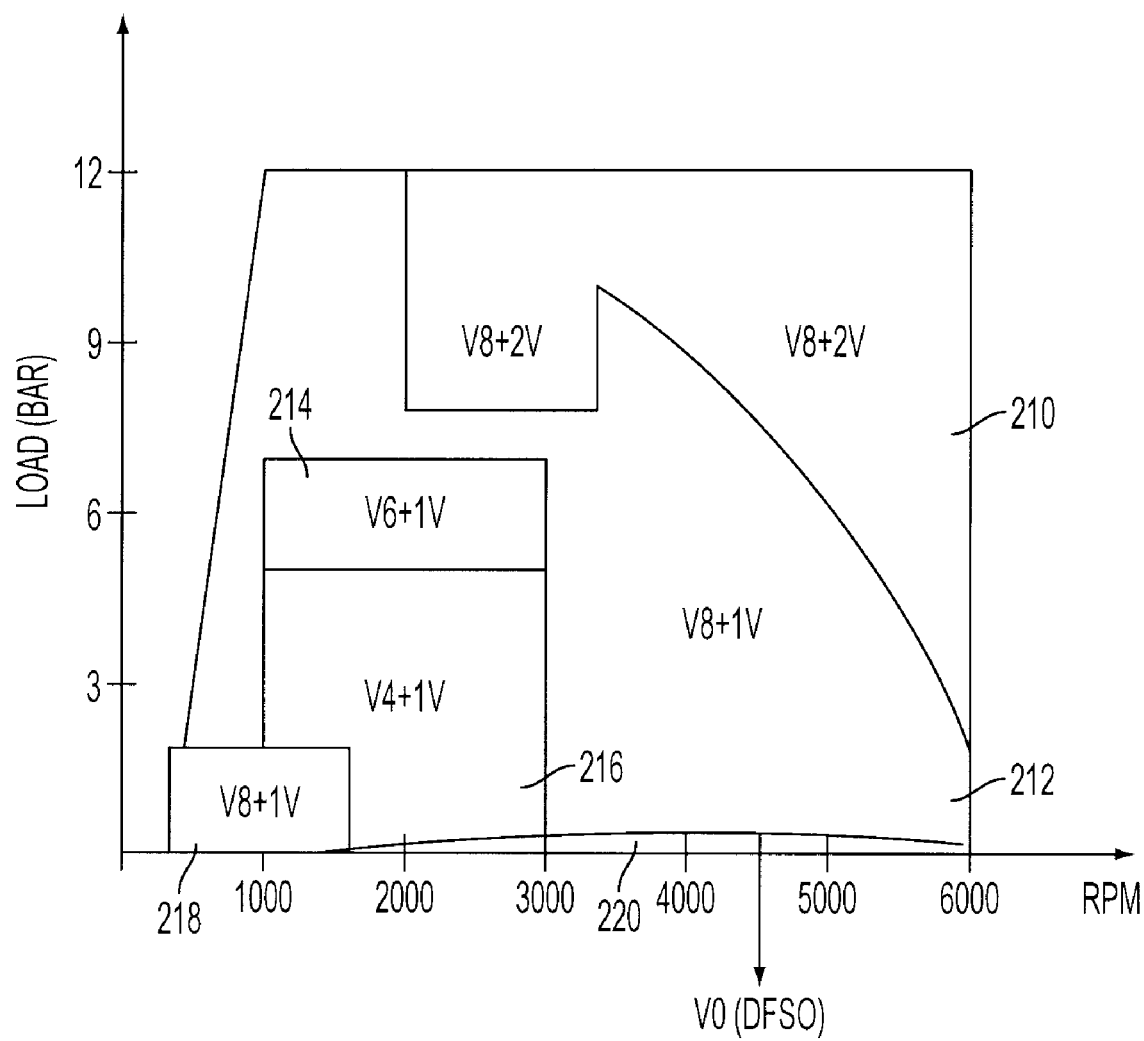
FIG. 2B shows an engine map of valve and cylinder modes.

Specifically, FIG. 2B shows a plurality of valve modes for an example V-8 engine, with two banks of four cylinders. It should be appreciated that FIG. 2B is an example map that may be used, and various modifications and/or substitutions are possible. Further, valve modes may be selected based on algorithms and other operating conditions, such as engine torque, engine temperature, exhaust temperature, and/or others.

Continuing with FIG. 2B, engine cylinder mode 210 includes V-8 operation with two intake valves active (V-8+ 2V) at higher engine speed and load conditions. Moving from higher speed/load, the next mode 212 includes V-8 operation with single valve operation (which may be alternating intake valve operation). Next, mode 214 shows V-6 operation, again with one intake valve operation (which may be alternating intake valve operation), such that two cylinders operate with intake and/or exhaust valves held closed, and other valves held open if not held closed, and without fuel injection. Next, mode 216 shows V-4 operation, with one intake valve operation (which may be alternating intake valve operation), and mode 218 shows V8 operation with one intake valve operation (which may be alternating intake valve operation). Note that each of the one intake valve operation modes may use levitation operation, although mode 218 may used ballistic valve operation. Finally, mode 220 shows all cylinders deactivated (V0) and with deceleration fuel shut-off (DFSO).

Returning to FIG. 2A, in 226 the routine determines whether a transition in intake valve mode is present in that a different mode is selected in 224 compared with a current valve mode. This determination may be performed on a cylinder by cylinder basis in the example where different cylinders operate with different valve modes. When a transition is identified, the routine continues to 228 to select a transition sequence. For example, if all cylinders are transitioning from a first valve mode to a second valve mode, the routine may select a transition that changes all cylinder valve modes in a single engine cycle, or may transition over a plurality of engine cycles (e.g., one cylinder per engine cycle), for example.

Next, in 230, the routine transitions the cylinders according to the selected sequence, and then compensates air, fuel, and/or spark during the transition to balance engine torque and maintain a desired exhaust air-fuel ratio in 232. As described with regard to FIGS. 3-4, for example, various approaches may be used individually or together to compensate for the transition, where the selection may be adjusted with vehicle, environmental, and/or engine operating conditions to achieve improved performance.

Figure 3:
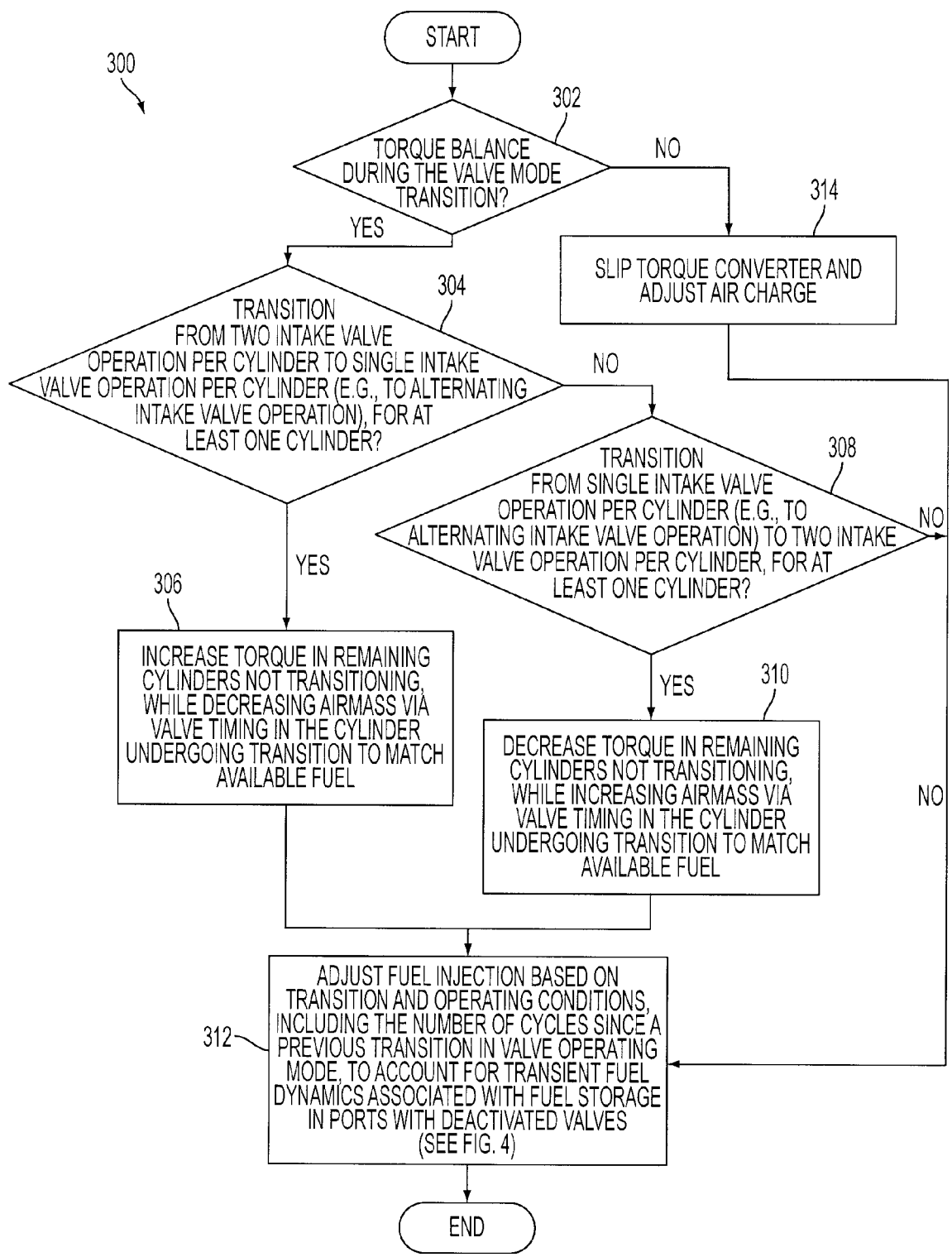

Specifically referring to FIG. 3, a routine 300 is described for compensating engine operation during selected intake valve mode transitions. First, in 302, the routine determines whether torque balancing may be used, such as when transitioning one cylinder in each engine cycle, until all cylinders are transitioned (e.g., four engine cycles may be used for transitioning each of four cylinders in a four cylinder engine), or when transitioning all engine cylinders in a single engine cycle. If so, the routine continues to 304. Otherwise, the routine continues to 314.

In 314, the routine matches air charge to available fuel by adjusting intake and/or exhaust valve opening and/or closing timing and may slip (e.g., unlock and control clutch pressure to provide a desired slip ratio or slip speed) the torque converter. In this example, such an approach may be used when an emission control device catalyst can tolerate one engine cycle with a lean or rich air-to-fuel ratio, and can further tolerate a single cycle potential misfire event due to air-to-fuel ratio enleanment. If so, the air-fuel ratio can re-establish on the second cycle.

In 304, the routine determines whether a transition from two intake valve operation per cylinder operation to single intake valve operation per cylinder (e.g., to alternating intake valve operation), for at least one cylinder is present. When the answer to 304 is yes, the routine continues to 306, and otherwise continues to 308 to determine whether a transition from single intake valve operation per cylinder (e.g., to alternating intake valve operation) to two intake valve operation per cylinder, for at least one cylinder, is present. If the answer to 308 is yes, the routine continues to 310.

In 306, such as when transitioning from two intake valves per cylinder operation to one intake valve per cylinder operation, the routine increases torque in the remaining cylinders not transitioning, while decreasing air charge via valve timing in the cylinder undergoing transition to match available fuel. Likewise, in 310, such as when transitioning from one intake valve per cylinder operation to two intake valves per cylinder operation, the routine decreases torque in remaining cylinders not transitioning, while increasing air charge via valve timing in the cylinder undergoing transition to match available fuel.

In one example, conducting valve mode transitions on one cylinder in a one engine cycle approach can reduce torque disturbances. Specifically, in one example of such operation, only one cylinder undergoes a valve mode transition during one engine cycle, while torque and air-fuel ratio of remaining cylinders, which do not undergo transition in this engine cycle, may be adjusted to still achieve overall cycle average engine torque and desired air-fuel ratio. The torque and air adjustments on remaining cylinders can be effected by valve timing and fuel adjustments on these cylinders. The valve timing to the cylinder which undergoes the valve mode transition in a given engine cycle can also be adjusted to achieve an air-fuel ratio in that cylinder which sustains some level of combustion and torque generation, as opposed to a misfire.

As an approximation, for the transition from dual valve mode to the alternating valve mode, the torque output of each of the remaining cylinders may be increased by multiplying it with a factor of $$\left(1 + \frac{L}{n_c - 1}\right),$$

while the valve timing on the cylinder undergoing transition may be changed to change the air mass (air charge) in the cylinder by multiplying it by a factor of (1−L), i.e., to match the available fuel. In this example, as described in further detail below, L is a fraction of fuel mass which is left at a deactivated port from the current injection, and is between 0 and 1, and $n_C$ is the number of cylinders. For the transition from the alternating valve mode to the dual valve mode, the torque output of each of the remaining cylinders may be decreased by multiplying it by a factor $$\left(1 - \frac{L}{n_c - 1}\right),$$

while the valve timing on the cylinder undergoing transition may be changed to change the air mass in the cylinder by multiplying it by a factor of (1+L), i.e., to match the available fuel.

Continuing with FIG. 3, from either 310, 314, or 306, the routine continues to 312 to adjust fuel injection based on transition and operating conditions, including the number of cycles since a previous transition in valve operating mode, to account for transient fuel dynamics associated with fuel storage in ports with deactivated valves. Further details of the operation of an example fuel compensation for a particular valve mode transition are described with regard to FIG. 4, for example.

Figure 4:
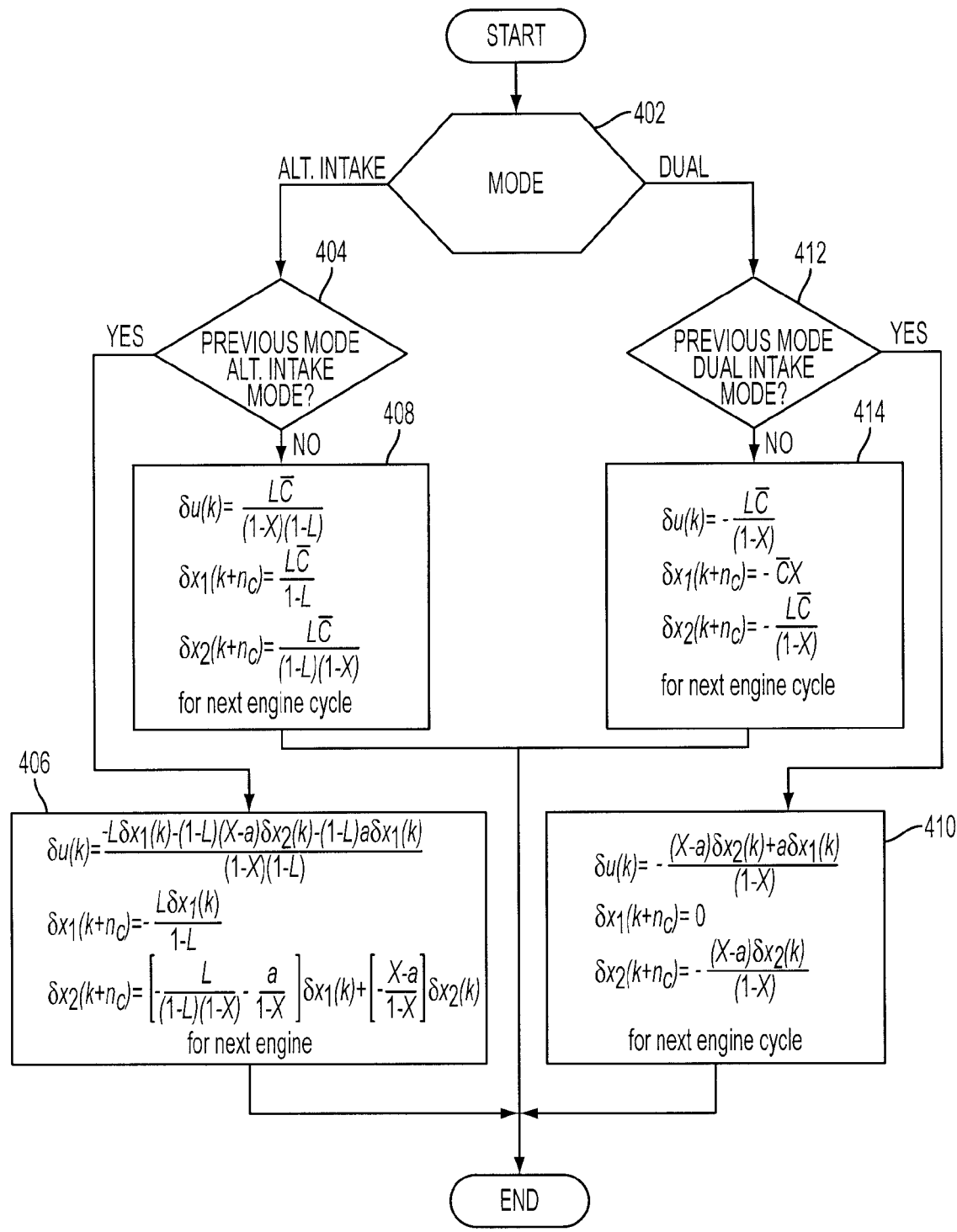

The routine of FIG. 4 provides an embodiment showing fuelling compensation for valve mode transitions between AI and DI valve modes. This embodiment uses an example system model developed to capture fuel wall-wetting behavior and the effect of valve mode transitions. It is includes two sub-models: a fuel wall-wetting sub-model and a port fuel induction sub-model.

In formulating the overall model, various assumptions were made, however, different assumptions may also be used that lead to alternative models, which may also be used. For example, the model described herein assumes that the cumulative behavior of the fuel evaporated from the puddles formed at the two ports of each cylinder can be captured by a single model, which enables compensation for valve mode transitions to be modularly added to an already existing wall-wetting/cylinder deactivation compensation strategy, which is individual cylinder-based but not individual port-based. While an individual port-based wall-wetting model may be used, a compensation strategy evolved on the basis of such a model may require a larger number of states to be updated at foreground update rates and may degrade chronometrics and memory requirements. Further, such an approach may be applied when the evaporation time constant is much longer than a single engine cycle (which may be the case at cold engine conditions and/or at high manifold pressure conditions), or if the fraction of fuel which replenishes the puddle is small (which may be the case at warm conditions).

A wall-wetting model for a Port Fuel Injection Engine can be written, on an individual cylinder basis, as $$m_{fc}(k+n_c) - m_{fi}(k+n_c) = a[m_{fc}(k) - m_{fc}(k)] + X[m_{fi}(k) - m_{fi}(k+n_c)], \quad (1)$$

where
- k is the event number;
- $n_c$ is the number of engine cylinders;
- $m_{fi}$ is the injected fuel mass;
- $m_{fc}$ is the fuel mass inducted into the engine cylinders during dual valve mode operation or ready to be inducted into the engine cylinders during alternating intake valve mode operation;

$$a = e^{-\frac{T_c}{\tau}},$$

where τ>0 is the fuel evaporation time constant in sec and $T_c$ is the time duration of a single engine cycle in sec;
0≦X<1 is the fraction of injected fuel which replenishes the fuel puddle, and may depend on the valve mode.

The port fuel induction model can be formulated as follows. Firstly, for the alternating intake valve mode, if k is not the first event for the given cylinder after entering the alternating intake valve mode, then $$C(k) = L \cdot m_{fc}(k - n_c) + (1 - L) \cdot m_{fc}(k), \quad (2)$$

where
- C is the fuel mass inducted into the cylinder;
- 0≦L≦1 is the fraction of fuel mass which is left at the deactivated port from the current injection.

If k is the first event for the given cylinder after entering the alternating intake valve mode, then $$C(k) = (1 - L) \cdot m_{fc}(k)$$

For the dual intake valve mode, If k is not the first event for the given cylinder after entering the dual intake valve mode, then $$C(k) = m_{fc}(k).$$

For the dual intake valve mode, If k is the first event for the given cylinder after entering the dual intake valve mode, then $$C(k) = L m_{fc}(k - n_c) + m_{fc}(k).$$

These equations are developed based on the assumption that the fuel vapor at the engine port is inducted during the single engine event. The in-cylinder air-to-fuel ratio is $$AF(k) = m_{ac}(k) / C(k),$$

where $m_{ac}(k)$ is air charge mass per cylinder. The measured air-to-fuel ratio will then have the following form, $$AF_m(k+1) = \alpha AF_m(k) + (1 - \alpha) AF(k - d),$$

where $$-\frac{T_e}{\log(\alpha)}$$

is the total time constant of the A/F sensor and exhaust mixing, where $T_e$ is the duration of a single engine cycle in sec;
d is the delay measured in the number of events.

The parameters of the model to be identified, assuming that α and d are known, include a,X,L.

Figure 5:
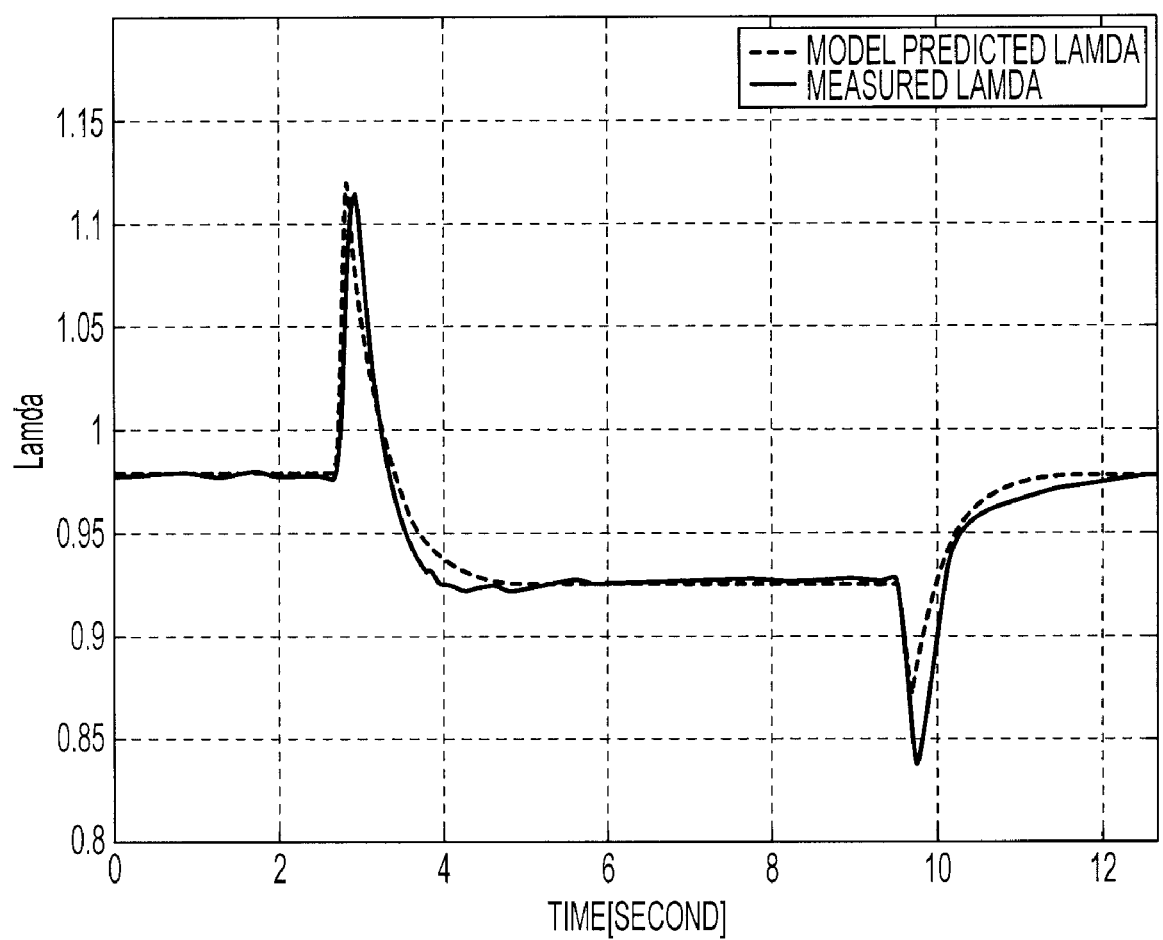
FIG. 5 shows model performance for predicting air-fuel ratio excursions at 1000 RPM while valve mode switching from two intake valves to alternating one intake valve operation, and back.

FIG. 5 shows example air-fuel ratio excursion data during valve mode transitions from a V8 engine operating at 1000 rpm with constant fueling and valve timing. The model parameters used were a=0.1, X=0.2, L=0.4, α=0.93.

Returning to FIG. 4, a routine 400 is described for adjusting fueling during a transition in a number of active intake valves to account for fuel storage in inactive intake valve ports, etc. In 402, the routine identifies a valve mode, such as AI, DI, etc. When AI mode is present, the routine continues to 404. When DI mode is present, the routine continues to 412.

In 404, the routine determines whether a previous valve mode for the particular cylinder was AI. If so, the routine continues to 406, and otherwise continues to 408. Similarly, in 412, the routine determines whether a previous valve mode for the particular cylinder as DI, and if so continues to 410, and otherwise continues to 414.

The fueling adjustments set forth in 406, 408, 410, and 414 are summarized below for the example where all engine cylinders may transition valve modes in one engine cycle, although the fueling adjustments may be applied under various other transition modes, such as one engine cylinder in one engine cycle, as noted above. Specifically, a discrete implementation is shown in FIG. 4 in which the fuel injection control output "du" is determined for each cylinder as indicated. The equations in FIG. 4 are in the variation forms of the state equations described in the following paragraph. du(k) =δu(k)=δm$_{fi}$(k), dx1(k)=δx$_1$(k)=δm$_{fc}$(k−n$_c$), and dx2(k)=δx$_2$(k)=δm$_{fi}$(k−n$_c$).

When transitioning from DI to AI, on the first cycle, the fuel injection amount may be determined as:

$$m_{fi}(k) = \frac{\frac{\overline{C}}{1-L} - am_{fc}(k-n_c) - (X-a)m_{fi}(k-n_c)}{1-X},$$

or in state variation form, $$\delta u(k) = \frac{L\overline{C}}{(1-X)(1-L)}$$

$$\delta x_1(k+n_c) = \frac{L\overline{C}}{1-L}$$

$$\delta x_2(k+n_c) = \frac{L\overline{C}}{(1-L)(1-X)}$$

for next engine cycle
where,
($\overline{C}$ is the desired in-cylinder fuel mass), δC(k)=C(k)−$\overline{C}$=0, and m$_{fi}$(k)=δm$_{fi}$(k)+$\overline{C}$.

Similarly, for subsequent cycles:

$$\delta m_{fi}(k) = \frac{\delta m_{fi}(k-n_c) - (1-L)a\delta m_{fc}(k-n_c) - L\delta m_{fc}(k-n_c) - (1-L)(X-a)}{(1-X)(1-L)},$$

or in state variation form, $$\delta u(k) = \frac{-L\delta x_1(k) - (1-L)(X-a)\delta x_2(k) - (1-L)a\delta x_1(k)}{(1-X)(1-L)}$$

$$\delta x_1(k+n_c) = -\frac{L\delta x_1(k)}{1-L}$$

$$\delta x_2(k+n_c) = \left[-\frac{L}{(1-L)(1-X)} - \frac{a}{1-X}\right]\delta x_1(k) + \left[-\frac{X-a}{1-X}\right]\delta x_2(k)$$

for the next engine cycle.

When transitioning from AI to DI if the operation has been in steady state before the transition, on the first cycle, the fuel injection amount may be determined as:

$$m_{fi}(k) = \frac{\overline{C} - Lm_{fc}(k-n_c) - am_{fc}(k-n_c) - (X-a)m_{fi}(k-n_c)}{1-X}$$

Or, in state variation form, $$\delta u(k) = \frac{L\overline{C}}{(1-X)}$$

$$\delta x_1(k+n_c) = -\overline{C}X$$

$$\delta x_2(k+n_c) = -\frac{L\overline{C}}{(1-X)}$$

for the next engine cycle.
And for subsequent cycles:

$$\delta m_{fi}(k) = \frac{-(X-a)\delta m_{fi}(k-n_c) - a\delta m_{fc}(k-n_c)}{(1-X)}$$

or, in state variation form, $$\delta u(k) = -\frac{(X-a)\delta x_2(k) + a\delta x_1(k)}{(1-X)}$$

$$\delta x_1(k+n_c) = 0$$

$$\delta x_2(k+n_c) = -\frac{(X-a)\delta x_2(k)}{(1-X)}$$

for the next engine cycle.

In this way, it is possible to utilize an estimate of the amount of fuel which is left in a deactivated port, and with the knowledge of this parameter, correct the fueling rate. This enables a faster transition and may use a more persistent activity of the fuel continuing into several cycles after the transition to reduce air-fuel ratio excursions.

Note that in some example, the above compensation assumes that L<0.5. If L>0.5, then the routine may compute fuel injection amounts for the 1st cycle to reduce predicted A/F excursion on the 1st and 2nd cycles. Specifically, the routine may change compensation algorithm for the 2nd and subsequent cycles in 1V mode to use the following:

δm$_{fi}$(k)=−k$_1$δm$_{fc}$(k−n$_c$)−k$_2$δm$_{fi}$(k−n$_c$)

Where the gains may be scheduled as the solutions of a LQ (linear-quadratic) problem, where $$J = \sum_{k=0}^{\infty} q \cdot (\delta C(k))^2 + (\delta m_{fi}(k))^2 \rightarrow \min$$

Figure 6:
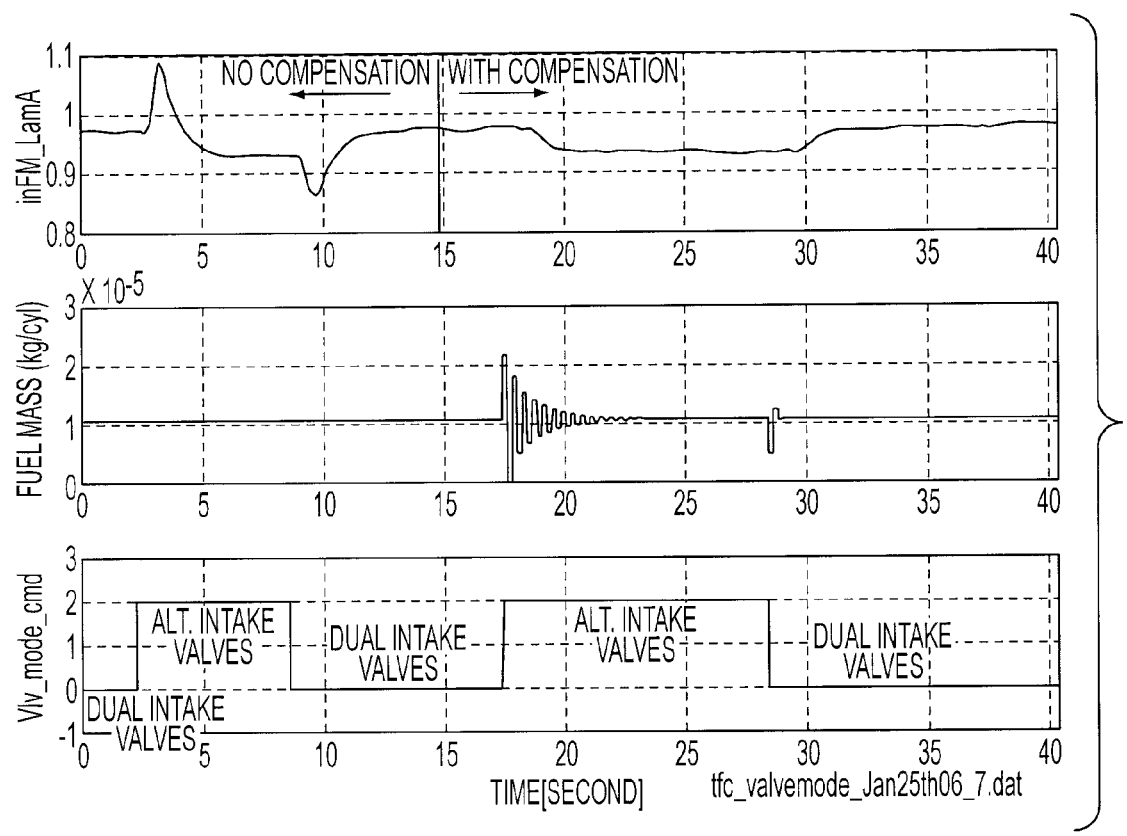
FIG. 6 shows experimental results at 600 RPM when compensating fuel injection while switching valve mode from two intake valves to alternating one intake valve operation, and back.

FIG. 6 shows example experimental results conducted on a V-8 engine at lower engine speeds and lower load operating conditions, where the engine included asymmetric intake ports. Even with the asymmetry of the intake ports, experimental results demonstrate that the compensation strategy may mitigate air-fuel ratio excursions during valve mode transitions between dual valve mode and alternative valve mode. The compensation has further been shown to reduce misfires during the switching from dual valve mode to alternating valve mode.

In particular, FIG. 6 shows experimental results for engine speed at 650 RPM and with engine torque at approximately 70 Nm. A higher value of L=0.46 showed improved results at lower speeds (e.g., 650 and 1000 rpm) and a lower value of L=0.4 showed improved results at 1250, 1500 and 2000 rpm. As such, L may be scheduled as a function of engine speed, and further may be adjusted with engine load. With the compensation enabled, transient air-to-fuel ratio excursions are reduced, while the steady-state air-to-fuel ratio difference between the dual and alternating valve modes is due to an air charge mismatch for the two valve modes at the same valve timing settings, and would be compensated via steady state fueling not included in the experimental tests.

Specifically, FIG. 6 shows that when transitioning to AI mode, the fuel injection command/delivery oscillates. Such operation can result in reduced air-fuel excursions as described below. Specifically, when a cylinder enters to alternating intake valve mode for the first time from dual intake valves mode, a significant portion of injected fuel may be stored at the deactivated port and not enter in the cylinder while air charge for this cylinder event may stay at the required level. To make the in-cylinder fuel mass stay at the desired value, the injected fuel mass is increased to the level that fuel charged into the cylinder can reach the desired value. This increased injected fuel applies to cylinders when they enter the alternating intake valve mode for the first time.

In the 2nd cycle after a cylinder enters alternating valve operation, there may be a significant amount of fuel at the deactivated port, which is going to be reactivated while the other intake valve which has been in operating in last cycle is going to be deactivated. The fuel stored at the deactivated port from the first cycle of alternating valve cycle is released in the 2nd cycle of alternating valve operation. The amount of fuel in the deactivated port from the first alternating valve operation may be not too far away from the desired fuel mass for the second cycle of single valve operation, thus the injected fuel for this cycle can reduced to get required fuel mass value in the cylinder. This may result in a significant lower fuel mass than desired fuel mass is observed for the second cycle into alternating intake valve mode. Similar reasoning shows that the third cycle of alternating valve mode should increase injected fuel mass and reduce injected fuel mass in the fourth cycle and so on.

When the engine/cylinder switches from alternating valve mode to dual valve mode, there may be only a one time fuel puddle released from the last alternating cycle and there may be no additional fuel perturbation due to dual valve operation. In this way, improved fueling control may be achieved.

It will be appreciated that the configurations and routines disclosed herein are exemplary in nature, and that these specific embodiments are not to be considered in a limiting sense, because numerous variations are possible. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A method of control fueling of a cylinder in an internal combustion engine, the cylinder having at least two intake valves, the method comprising:
   operating in a first mode with one active intake valve and one inactive intake valve during a cycle of the cylinder;
   operating in a second mode with two active intake valves during a cycle of the cylinder; and
   adjusting a fuel injection from an injector configured to deliver fuel through at least the two intake valves, where the fuel injection adjustment is responsive to a transition in modes and based on whether the transition is from the first mode to the second mode, or from the second mode to the first mode.

2. The method of claim 1 wherein in the first mode, the cylinder alternates the one active valve among the two intake valves.

3. The method of claim 1 wherein the fuel injection adjustment is further based on a number of cylinder cycles from the transition.

4. The method of claim 2 wherein the fuel adjustment differs based on whether the transition is from the first mode to the second mode, or from the second mode to the first mode in that the fueling adjustment oscillates to a greater extent when transitioning to the first mode.

5. The method of claim 3 wherein the fueling is adjusted in a first cycle of the transition differently than subsequent cycles after the transition.

6. The method of claim 1 wherein the first mode includes valve levitation.

7. The method of claim 1 wherein the two intake valves are electrically actuated intake valves.

8. The method of claim 1 wherein each cylinder of the engine is transitioned between the modes in a single engine cycle.

9. A method of control fueling of cylinders in an internal combustion engine, the cylinders each having at least two intake valves, the method comprising:
   operating cylinders in a first mode with one active intake valve and one inactive intake valve during a cylinder cycle, where the active valve alternates among the two intake valves;
   operating cylinders in a second mode with two active intake valves during a cylinder cycle;
   transitioning between the modes, where one cylinder transitions valve modes during each engine cycle until all cylinders transition valve mode, where when transitioning from the second mode to the first mode, increasing torque in remaining cylinders not transitioning, while decreasing air via valve timing in the cylinder undergoing transition to match available fuel, and when transitioning from the first mode to the second mode, decreasing torque in remaining cylinders not transitioning, while increasing air via valve timing in the cylinder undergoing transition to match available fuel; and adjusting fuel injection during the transition.

10. The method of claim 9 further comprising adjusting a fuel injection from an injector configured to deliver fuel through at least the two intake valves, where the fuel injection adjustment is responsive to a transition in valve modes and based on whether the transition is from the first mode to the second mode, or from the second mode to the first mode.

11. The method of claim 10 wherein the fuel injection adjustment is further based on a number of cylinder cycles from the transition.

12. The method of claim 11 wherein the fuel adjustment differs based on whether the transition is from the first mode to the second mode, or from the second mode to the first mode in that the fueling adjustment oscillates to a greater extent when transitioning to the first mode.

13. The method of claim 12 wherein the fueling is adjusted in a first cycle of the transition differently than subsequent cycles after the transition.

14. The method of claim 13 wherein the first mode includes valve levitation.

15. The method of claim 14 wherein the two intake valves are electrically actuated intake valves.

16. A system for an engine having a plurality of cylinders, comprising:

a cylinder with first and second intake ports, the cylinder further having a first electrically actuated intake valve coupling the first port to the cylinder and a second electrically actuated intake valve coupling the second port to the cylinder;

a fuel injector coupled to the cylinder, the injector positioned relative to the first and second port to inject at least some fuel in at least the first and second port during fuel injection;

a control system for operating in a first mode with one active intake valve and one inactive intake valve during a cycle of the cylinder, where the active intake valve alternates among the first and second electrically actuated intake valve, which is active at least during a portion of an intake stroke of the cylinder, operating in a second mode with both the first and second electrically actuated intake valves active during a cycle of the cylinder, and adjusting a fuel injection from the injector, where the fuel injection adjustment is responsive to a transition in modes and based on whether the transition is from the first mode to the second mode, or from the second mode to the first mode.

17. The system of claim 16 wherein the injector is symmetrically positioned relative to the first and second port.

18. The system of claim 16 wherein the injector is asymmetrically positioned relative to the first and second port.

19. The system of claim 16 wherein the controller further adjusts valve timing during the transition.

* * * * *